United States Patent
Arsenius

[15] 3,696,841
[45] Oct. 10, 1972

[54] HYDRAULIC FLUID THROTTLING DEVICE

[72] Inventor: Torsten Henry Arsenius, Goteborg, Sweden

[73] Assignee: SKF Industrial Trading and Development Company N.V., Amsterdam, Netherlands

[22] Filed: May 13, 1970

[21] Appl. No.: 36,789

[30] Foreign Application Priority Data

May 13, 1969 Sweden ..................6732/69

[52] U.S. Cl. ..................................138/42
[51] Int. Cl. ..................................F15d 1/02
[58] Field of Search ..........138/40, 42, 43; 184/7 CR; 251/127

[56] References Cited

UNITED STATES PATENTS

| | | | |
|---|---|---|---|
| 1,899,251 | 2/1933 | Zerk | 138/42 X |
| 2,021,079 | 11/1935 | Mittendorf et al | 138/42 |
| 1,687,286 | 10/1928 | Freer | 184/7 CR UX |
| 2,662,590 | 12/1953 | Reich | 138/42 X |

Primary Examiner—Edward J. Earls
Attorney—Howson and Howson

[57] ABSTRACT

A throttling device included in a hydraulic system, for instance of the kind supplying operating fluid to a hydrostatic bearing, includes plane, superimposed washers arranged in pairs and fitted into a recess having a plane bottom and arranged in the machinery component to be supplied with fluid, in such a manner that the fluid will flow in a generally axial direction through the recess. One first washer of the pair has a shallow groove in each side surface, and when this washer is placed between the plane bottom of the recess and the second washer of the pair, which has unserrated side surfaces but a central passage, the grooves will form the desired restriction to flow. By altering the cross section of the grooves, and/or by varying the number of pairs of washers any desired resistance to flow may be obtained.

1 Claim, 3 Drawing Figures

PATENTED OCT 10 1972  3,696,841

Inventor:
Torsten Henry Arsenius
by Howson & Howson
attys.

HYDRAULIC FLUID THROTTLING DEVICE

BACKGROUND OF THE INVENTION

The present invention refers to a throttling device, which is suited to restrict the flow of a pressure fluid supplied to hydraulically operated machinery components.

The device is designed preferably but not exclusively, to be used in connection with hydrostatic bearings and will below be described as used in connection with such a bearing.

Hydrostatic bearings may be designed to take care of radial as well as axial loads. A radial bearing may in its basic form include an inner cylindrical bearing surface and an outer bearing surface cooperating therewith. The latter surface is provided with a number of separate pockets, which communicate with a passage or a system of passages supplying a pressure fluid from one or more external sources. With one type of hydrostatic bearings a pump providing a constant flow of fluid is connected to each pocket in the bearing, which is a comparatively expensive arrangement. According to another embodiment a satisfactory result may be obtained by using a pump common to all pockets, whereby the cost will be considerably reduced.

In order to obtain the desired carrying capacity of a bearing according to the latter embodiment a throttling device is provided in each passage leading to a pocket. This device will bring about a pressure difference between the source and the pocket due to the outflow of fluid therefrom into the clearance between the bearing surfaces. The various pockets of the same bearing may require differently gauged throttling devices, and this calls for a very flexible design.

This clearance will be reduced in one part of the bearing, when the latter is subjected to a load, whereas the clearance will simultaneously increase in another part of the bearing. Due to this occurrence the pressure will increase at the loaded side of the bearing, but will decrease at the unloaded part thereof.

DESCRIPTION OF THE PRIOR ART

Throttling devices of known design have usually included a nozzle, which causes a turbulent flow. Other designs of throttling devices have included capillary tubes or annular passages, which cause a laminar flow. The known devices suffer from certain disadvantages which for instance with the first mentioned device consist therein that it must have a very narrow passage for the fluid flow. This means that the device is easily put out of action due to it being clogged by impurities. It is furthermore subjected to wear due to cavitation. The last mentioned types of throttling devices are more sturdy, but require more space. The capillary type must as a rule be mounted outside the bearing proper, which makes it expensive and furthermore liable to be damaged.

SUMMARY OF THE INVENTION

The invention refers to a throttling device, which brings about a laminar flow, which is easy to mount and by substitution of parts may be adjusted for controlling the flow of fluid to the individual pockets to suit the required outflow therefrom, and which furthermore is cheap to manufacture.

The device includes elements fitted into a recess adjacent to a machinery component to be supplied with hydraulic fluid, and the invention is characterized in the recess having a plane bottom, and the elements fitted therein including at least one pair of plane, superimposed washers. One of these washers is provided with a shallow groove in each side surface, said grooves running in parallel and extending from the center of the washer to the perimeter thereof, and being interconnected by passages formed between the pertaining washer and the side wall of the recess, the breadth and the depth of said grooves being chosen to provide a predetermined resistance to flow. The other washer of the pair has unserrated side surfaces and is provided with a centrally located passage permitting flow of the hydraulic fluid.

DESCRIPTION OF THE PREFERRED EMBODIMENT

The throttling device is mounted in a recess 1 arranged close by and communicating with one of the number of pockets (not shown), which are provided between the bearing surfaces of the bearing. These pockets are supplied with pressure fluid through a passage 2 in such a manner that the fluid will flow in a generally axial direction through the recess. In the present embodiment a washer 3 having lapped, plane surfaces and a center passage is fitted into the bottom of the recess 1. This washer does not form part of the invention, but is used for practical purposes as it is difficult to machine an absolutely plane bottom surface in the recess. The washer, which preferably is bonded to the structure, is more easily machined than the bottom surface of the recess and will compensate possible defects therein.

Figure 1:
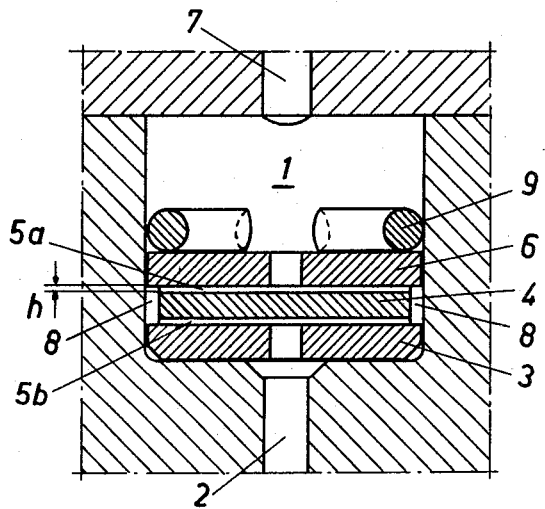
FIG. 1 shows a section through a throttling device mounted in a recess in the bearing.
Figure 2:
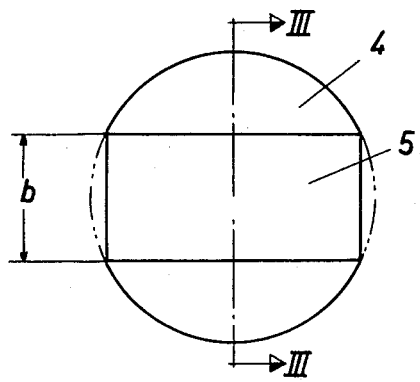
FIG. 2 shows a view from above of one of the washers included in the device.
Figure 3:
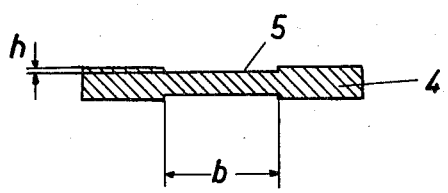
FIG. 3 shows a section along line 3—3 in FIG. 2.

A first washer 4 is mounted on top of washer 3, washer 4 also being provided with lapped plane surfaces. As shown in FIG. 2 each side surface of this washer is provided with shallow grooves 5 extending from the center of the washer towards the perimeter thereof. The grooves on opposite sides of the washer run parallel to each other, and are interconnected by the edge of the washer being cut at the end of the grooves.

From manufacturing point of view the circular washer is preferred. The washers must not necessarily basically have a circular shape, as shown on the drawing, but may have an arbitrary shape. It will then be necessary to cut the washers at the ends of the groove, in order that the grooves at opposite sides of the washer may be interconnected. The necessary communication may also be obtained by grooves formed in the side wall of the recess. In all embodiments the washers should cover the cross section of the recess, except at the axial passages at the ends of the grooves.

The breadth $b$, and the depth $h$, of each groove 5 is chosen in such a manner, that a clearance giving the required resistance to flow is obtained. The breadth will be significant in relation to the depth, whereby possible impurities in the fluid are caught, but will not clog the entire passage. This is often the result in a nozzle type devices, and will endanger the proper function of the bearing. In order to vary the resistance the magnitude of measure, h may in a practical embodiment be chosen from a series ranging from 50 microns to 200 microns, the breadth of the grooves $b$ being 5 mm.

The device also contains a third washer 6, which in the same manner as washer 3 is provided with lapped, plane side surfaces and a center passage. This washer is placed on top of washer 4 to form therewith a pair. In order to retain the washers during storing and transportation a locking member 9 is fitted into the recess, and may remain therein also when the bearing has been mounted for use. The throttling device will work in the following manner.

The pressure fluid will be supplied to the recess 1 by way of a passage 7 formed in the housing of the bearing. The fluid flows through the center passage in washer 6 and further outwards through clearance $5a$ between washers 4 and 6, and around the edges of washer 4, where passages 8 will be formed between the washer and the side wall of recess. Then further on through passage $5b$ between washers 4 and 3, and finally through the center passage in washer 3 to the passage 2 in the bearing body in which the recess is formed, to the pocket therein, to be supplied with fluid.

In order to increase the adjustability of the device further pairs of washers 4 and 6 may be fitted into the recess. The total resistance to flow will then increase with the number of such pairs.

A number of advantages are obtainable with a device of this type. The device has a flexible design, and it is very easy by a substitution of part to suit the resistance to the required value for providing the required flow to a specific pocket by selecting the dimension of the grooves or the number of washers. As the device is completely enclosed within the bearing it will not be possible for an un-authorized person to alter the value of the resistance determined.

What is claimed is:

1. A hydraulic fluid throttling device comprising a housing having a generally cylindrical hollow chamber therein closed at its upper end by a top wall having a central inlet opening therein leading into said chamber, and closed at its lower end by a bottom wall having a central opening therein leading from said chamber for the discharge of fluid therefrom; a first washer of a size and shape corresponding to the transverse cross section of said chamber and resting upon the wall defining the bottom of said chamber, said first washer having flat, parallel upper and lower surfaces and having a central opening passing therethrough in alignment with the central opening in said bottom wall; a second washer of a size and shape corresponding generally to the transverse cross section of said chamber and resting upon the upper surface of said first washer, said second washer having flat, parallel upper and lower surfaces each of which flat surfaces is provided with a diametrically extending groove of a depth between 50 microns and 200 microns and of a width of the order of 5 millimeters to provide resistance to the flow of said fluid therealong, said grooves being substantially parallel with respect to each other and being in communication through passages provided by cut-away portions on the periphery of said second washer at the ends of said grooves, whereby fluid may flow along one of said grooves, through the cut-away portions on the periphery of said second washer and along the other of said grooves; a third washer of a size and shape corresponding to the transverse cross section of said chamber and resting upon the upper surface of said second washer, said third washer having flat, parallel upper and lower surfaces and having a central opening passing therethrough in communication with the groove on the upper surface of said second washer, whereby fluid introduced into said chamber through the opening in the wall defining the top thereof may flow through the central opening of said third washer, through the groove on the upper surface of said second washer, through the passages formed along the periphery of the second washer at the opposite ends of said grooves, through the groove along the lower surface of said second washer, through the central opening in said first washer, and through the opening in the wall defining the bottom of said chamber; and a locking member superimposed upon the top surface of said third washer to retain the assembly of first, second, and third washers in position in the lower portion of said chamber.

* * * * *